United States Patent [19]

Albert

[11] 4,221,131
[45] Sep. 9, 1980

[54] VIBRATING BEAM ACCELEROMETER

[75] Inventor: William C. Albert, Boonton, N.J.

[73] Assignee: The Singer Company, Little Falls, N.J.

[21] Appl. No.: 42,826

[22] Filed: May 29, 1979

[51] Int. Cl.³ ............................................ G01P 15/09
[52] U.S. Cl. ............................ 73/517 AV; 248/206 A
[58] Field of Search .............. 73/517 R, 517 AV, 430, 73/432 A, DiG. 1; 248/206 A; 177/DIG. 5

[56] References Cited

U.S. PATENT DOCUMENTS

| 3,600,954 | 8/1971 | Clarke | 73/517 R |
| 4,104,920 | 8/1978 | Albert et al. | 73/517 AV |
| 4,149,422 | 4/1979 | Olsen et al. | 73/DIG. 1 X |

*Primary Examiner*—Jerry W. Myracle
*Attorney, Agent, or Firm*—Keith D. Beecher; T. W. Kennedy

[57] ABSTRACT

A vibrating beam accelerometer is provided which includes a quartz vibrating beam resonator as aa force transducer, and which also includes resiliently biased relief arms which release the quartz beam should the acceleration forces become excessive. The relief arms serve to protect the beam against overload forces, and to permit the proof mass of the accelerometer to be sufficiently high as to enable the accelerometer to measure accelerations in a relatively wide range as compared with the range capabilities of prior art vibrating beam accelerometers.

19 Claims, 9 Drawing Figures

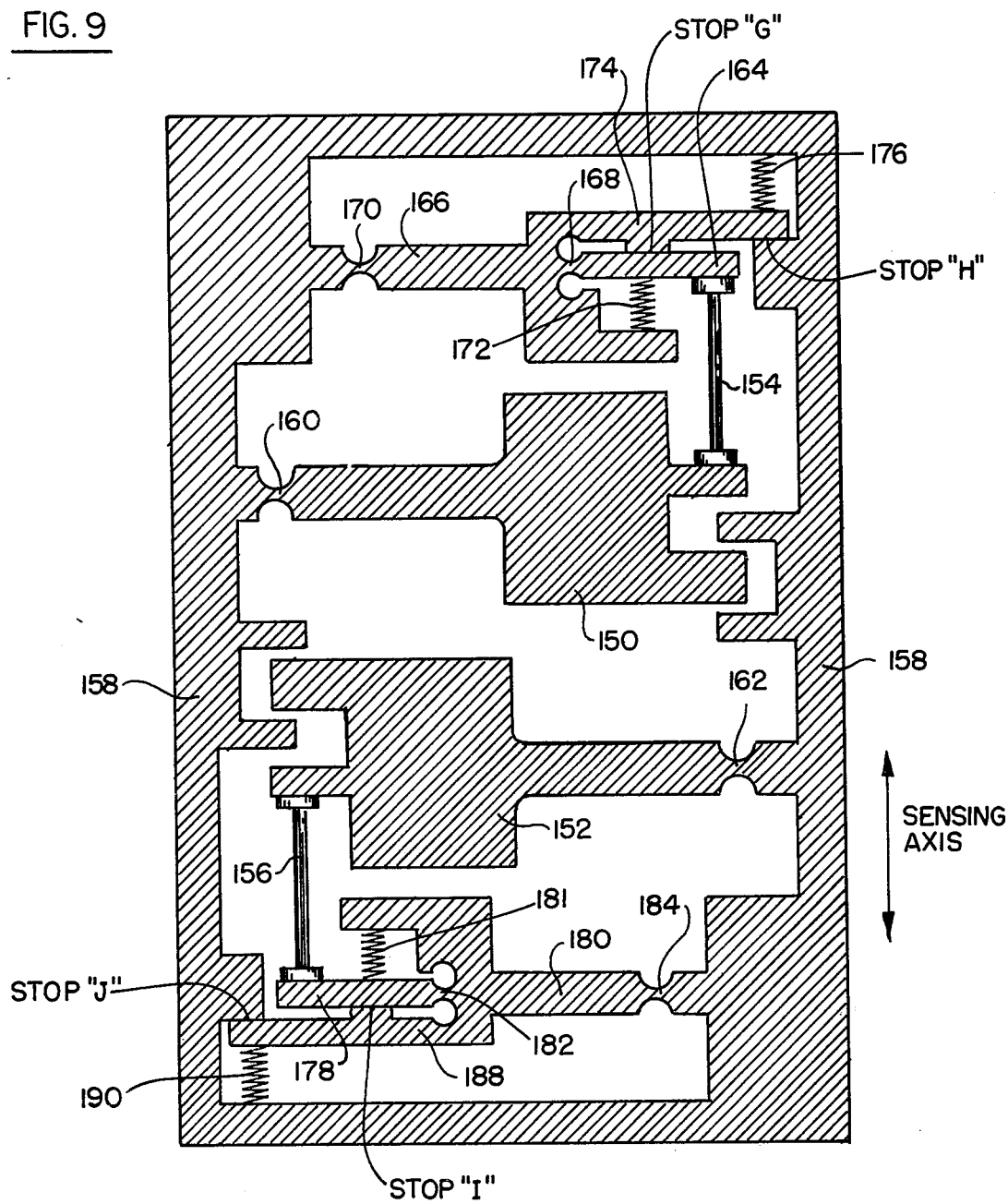

VIBRATING BEAM ACCELEROMETER

BACKGROUND

The vibrating beam accelerometer is basically a crystal oscillator whose frequency is made to be a systematic function of acceleration. The vibrating beam accelerometer incorporates a quartz vibrating beam force transducer, such as is described and claimed in U.S. Pat. No. 3,470,400 which issued Sept. 30, 1969; and in U.S. Pat. No. 3,479,536, which issued Nov. 18, 1969, both of which are assigned to the present Assignee.

The vibrating beam accelerometer is advantageous in that it is inherently a high precision measuring instrument which has an extremely large dynamic range. The vibrating beam accelerometer is susceptible to a fully solid state mechanization having no moving parts. Moreover, the accelerometer may be constructed to be small and compact, and at a relatively low cost.

However, since quartz is a brittle material, the resonator in the prior art vibrating beam accelerometer is susceptible to breakage from overload forces. These overload forces occur when the proof mass of the vibrating beam accelerometer is subjected to excessive handling shocks or input accelerations. Accordingly, an important objective of the present invention is to provide a vibrating beam accelerometer which is constructed such that the quartz resonator is protected from overload forces.

No such protective mechanism is provided in the prior art vibrating beam accelerometers, and the only way in which the resonator force loading may be maintained to a tolerable level in the presence of excessive handling shocks and excessively high input accelerations is to limit the proof mass of the accelerometer to a relatively low value. However, when the proof mass is relatively low, a substantial portion of the resonator force measuring range goes unused, for many applications. The construction of the vibrating beam accelerometer of the present invention, on the other hand, is such that the entire input range of the resonator is usable, up to the threshold at which the protective mechanism in the accelerometer becomes operative.

BRIEF DESCRIPTION OF THE DRAWINGS

FIG. 9 is a schematic sectional representation of a fourth embodiment of the invention.

DETAILED DESCRIPTION OF THE ILLUSTRATED EMBODIMENTS

Figure 1:
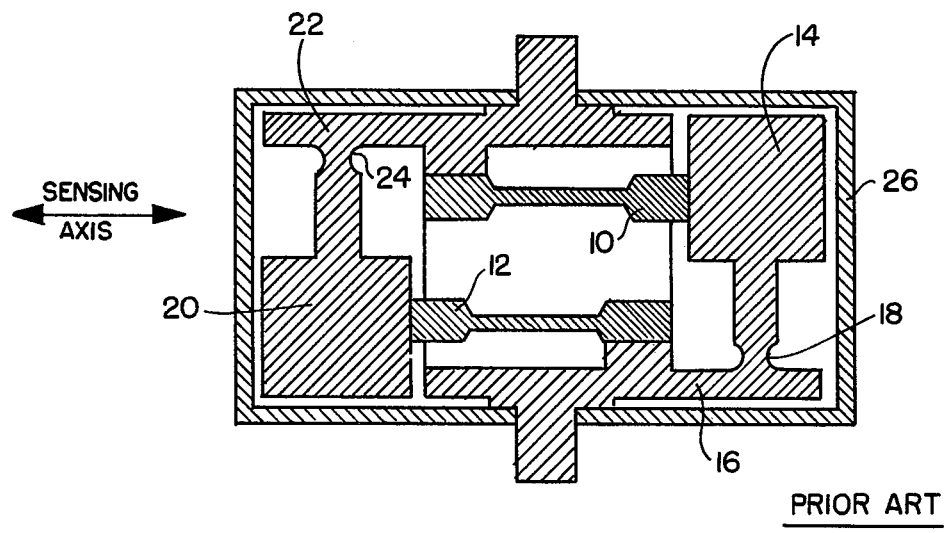
FIG. 1 is a schematic sectional representation of a prior art vibrating beam accelerometer.

The prior art vibrating beam accelerometer shown in FIG. 1 includes two quartz vibrating beam resonator transducers 10, 12. A proof mass 14 is attached to one end of resonator 10, and is hinged to a housing 16 by means of a pendulum flexure hinge 18. One end of resonator 12 is also attached to housing 16, as shown. The other end of resonator 12 is attached to a proof mass 20, and the latter mass is hinged to a housing 22 by means of a pendulum flexure hinge 24. The other end of resonator 10 is attached to housing 22, as shown. The vibrating beam accelerometer of FIG. 1 is enclosed in a vacuum can 26.

The proof mass 14, housing 16 and flexure hinge 18, in the prior art accelerometer of FIG. 1, are preferably machined from a single piece of berylium copper; as are proof mass 20, housing 22 and flexure hinge 24. Berylium copper is selected because of its high thermal conductive properties, and because its thermal expansion coefficient matches the thermal expansion coefficient of the quartz resonators 10 and 12.

The operating principle of the prior art accelerometer of FIG. 1 is the same as other prior art force-balance accelerometers. The inertial forces acting on the proof masses 14 and 20 as a result of input accelerations are balanced by the reaction forces produced by the resonators 10 and 12.

In the illustrating prior art vibrating beam accelerometer of FIG. 1, the two proof masses 14 and 20 are used, and they are suspended by the flexure hinges 18 and 24. These hinges provide extremely low constraints to forces parallel to the sensing axis, and they provide rigid support for forces in the two orthogonal directions relative to that axis.

The resonators 10 and 12 in the illustrated prior art accelerometer of FIG. 1 are mounted in such a way that an input acceleration places one resonator in tension and the other in compression. The resonators are used as resonating elements in respective electronic oscillator circuits in which the resonators are incorporated. The frequency of each oscillator is a sensitive function of input acceleration, since increases in tension of the first resonator increases the corresponding oscillator, and increases in compression of the second resonator decreases the frequency of its corresponding oscillator. By processing the difference frequency of the two oscillators, a very accurate and linear scaling of acceleration may be obtained.

As explained above, certain problems have been encountered in the prior art vibrating beam accelerometers of the type shown in FIG. 1. These problems result from the brittle nature of the quartz resonators 10 and 12, and particularly from the inability of the resonators to withstand excessive tension forces. These problems are solved in the accelerometer of the present invention by providing a relief means for the resonators should the input accelerations or handling forces become excessive.

Figure 2:
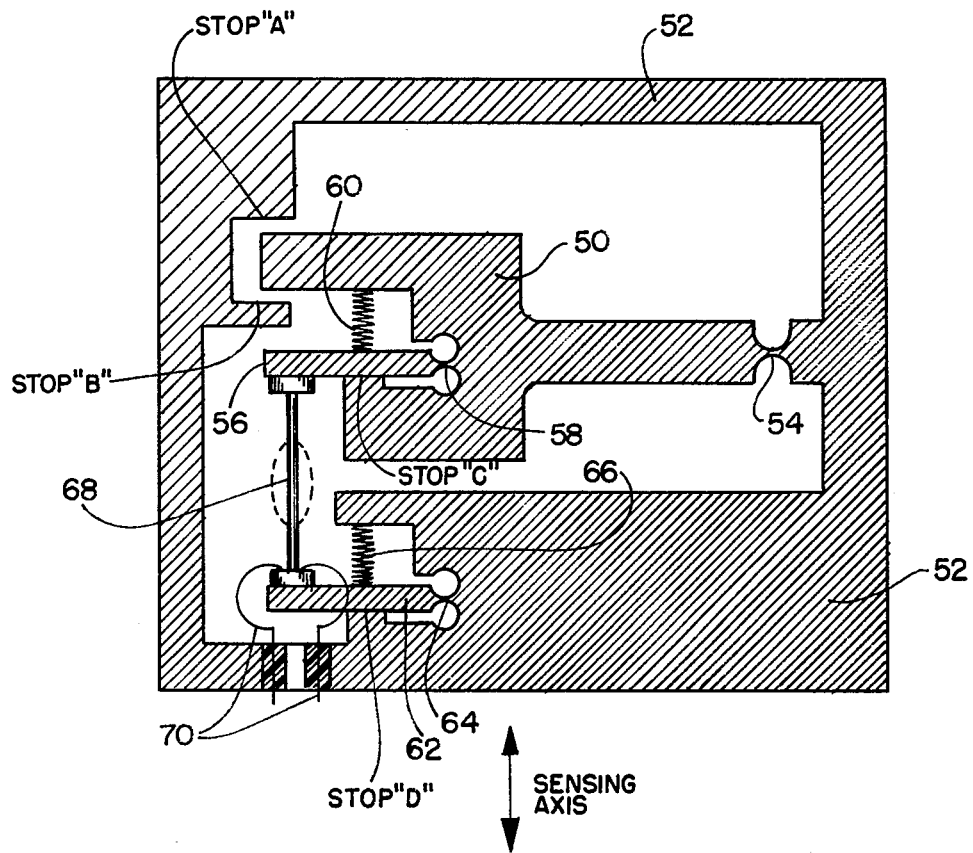
FIGS. 2-4 are schematic sectional representations of a vibrating beam accelerometer constructed in accordance with one embodiment of the invention, and which incorporates a protective mechanism for the quartz resonator in accordance with the concepts of the invention, the three representations showing different operating conditions of the accelerometer.
Figure 3:
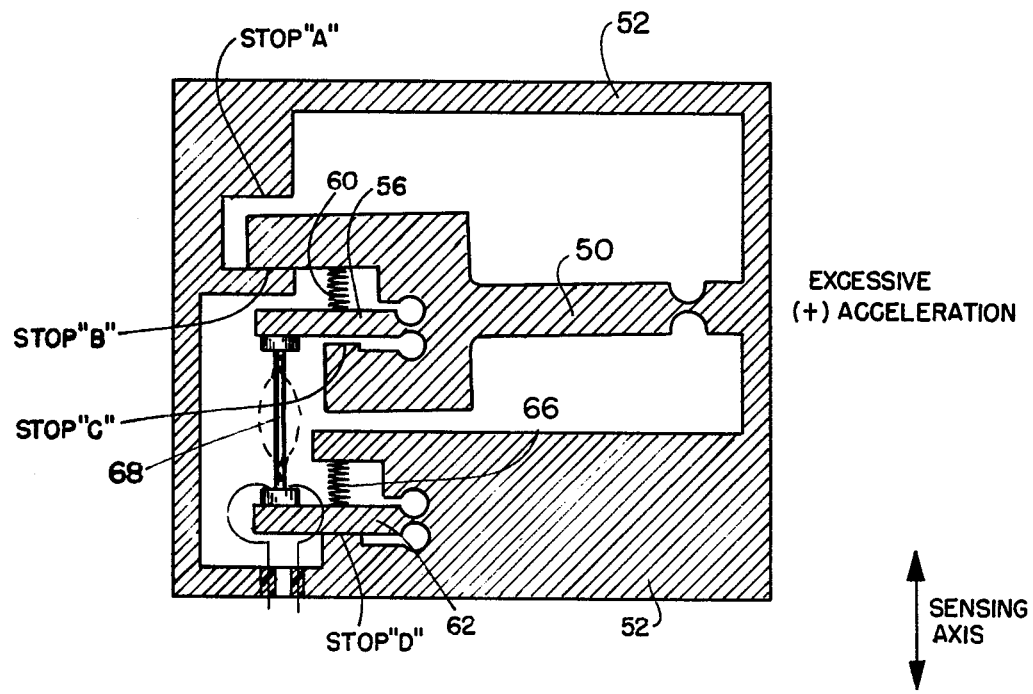
Figure 4:
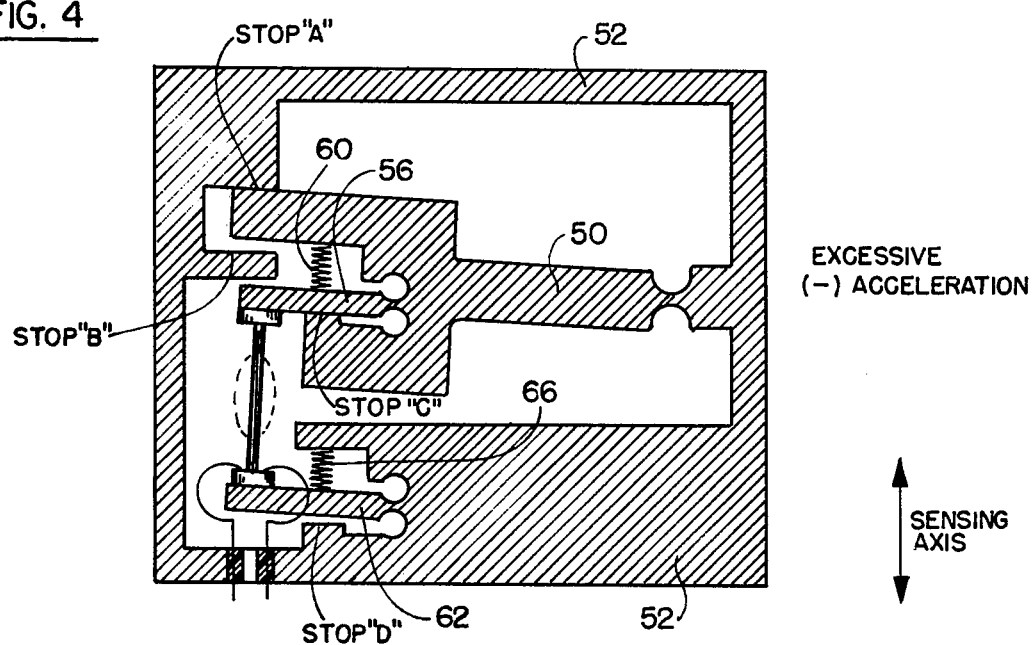

One embodiment of the vibrating beam accelerometer incorporating the concepts of the invention is shown in FIGS. 2-4. In the embodiment of FIGS. 2-4, a proof mass 50 is hinged to a housing 52 by means of a flexure hinge 54. As illustrated, housing 52 is shaped to provide appropriate stops "A", "B" which limit the upward and downward travel of the proof mass. A relief arm 56 is hinged to the proof mass 50 by means of a flexure hinge 58, the relief arm 56 being normally biased against a stop "C" on the proof mass by a pre-loading spring 60. A second relief arm 62 is hinged to housing 52 by means of a flexure hinge 64, the second relief arm being normally biased against the stop "D" on the housing by means of a second pre-loading spring 66.

A quartz vibrating beam resonator 68 is attached at its respective ends to the relief arms 56 and 62, as illustrated. Electric connections from the resonator to the associated oscillator circuit may be made by electric leads 70.

As shown in FIGS. 2-4, the proof mass 50 of the accelerometer is supported perpendicular to the sensing axis by the conventional pendulum flexure hinge 54. One end of the vibrating beam force sensing resonator 68 is attached to the housing 52 by means of the relief arm 62, while the other end of the vibrating beam resonator 68 is attached to the proof mass 50 by relief arm 56.

The relief arms 56 and 62 are normally free to turn about their respective flexure hinges 58 and 64, but they are prevented from doing so by the forces exerted by the pre-loading springs 60, 66. The pre-loading springs 60, 66 force the relief arms 56, 62 against their respective stops "C" and "D". The springs exert a predetermined force on the relief arms 56, 62, to hold the relief arms against their respective stops "C" and "D" (FIG. 2). As long as the relief arms are in the position shown in FIG. 2, they behave as if they were a rigid part of the proof mass 50 and housing 52.

When the accelerometer is subjected to an acceleration along the sensing axis, the motion of proof mass 50 relative to housing 52 is restrained by forces exerted by resonator 68. Both the housing and proof mass experience these forces by way of the relief arms. If the input acceleration, and hence resonator forces, become excessive, the pre-loading force of one, or the other, of the pre-loading springs 60, 66, will be exceeded; and one, or the other, of the relief arms 56, 62 will turn about its flexure hinge 58 or 64. This motion of the individual relief arms permits the proof mass 50 to move and engage one or the other of the proof mass stops "A" or "B". When the proof mass 50 engages a stop "A" or "B", any excessive force is experienced by the housing 52 through the stops, and not by the resonator 68.

FIG. 3 illustrates the unloading action described above which results from an excessive positive input acceleration; and FIG. 4 illustrates the unloading action which results from an excessive negative input acceleration. It should be noted that the excessive positive and negative acceleration inputs are handled by the separate relief arms 56, 62. The input acceleration level at which the unloading action of the relief arms occurs is determined by the preset forces of the pre-loading springs 60, 66.

The vibrating beam construction described above, including the unloading mechanism in the vibrating beam accelerometer, allows more of the resonator force measuring range to be used, as compared with the prior art accelerometer of FIG. 1. For example, an accelerometer may be required to measure up to 10 g as a full scale requirement, and yet it may also be required to withstand up to 200 g handling shocks. The proof mass with the structure of the present invention can be sized to impart the full safe allowable force of the resonator 68 at 10 g acceleration inputs. When the acceleration, or shock inputs extend slightly above 10 g, the excess load is transferred to the proof mass stops "A" or "B". In the prior art accelerometer of FIG. 1, the proof mass had to be sized low enough for the resonator itself to withstand the highest expected shock or input acceleration load and, for that reason, the resonator measuring range between 10 g and 200 g went unused in the prior art units.

Figure 5:
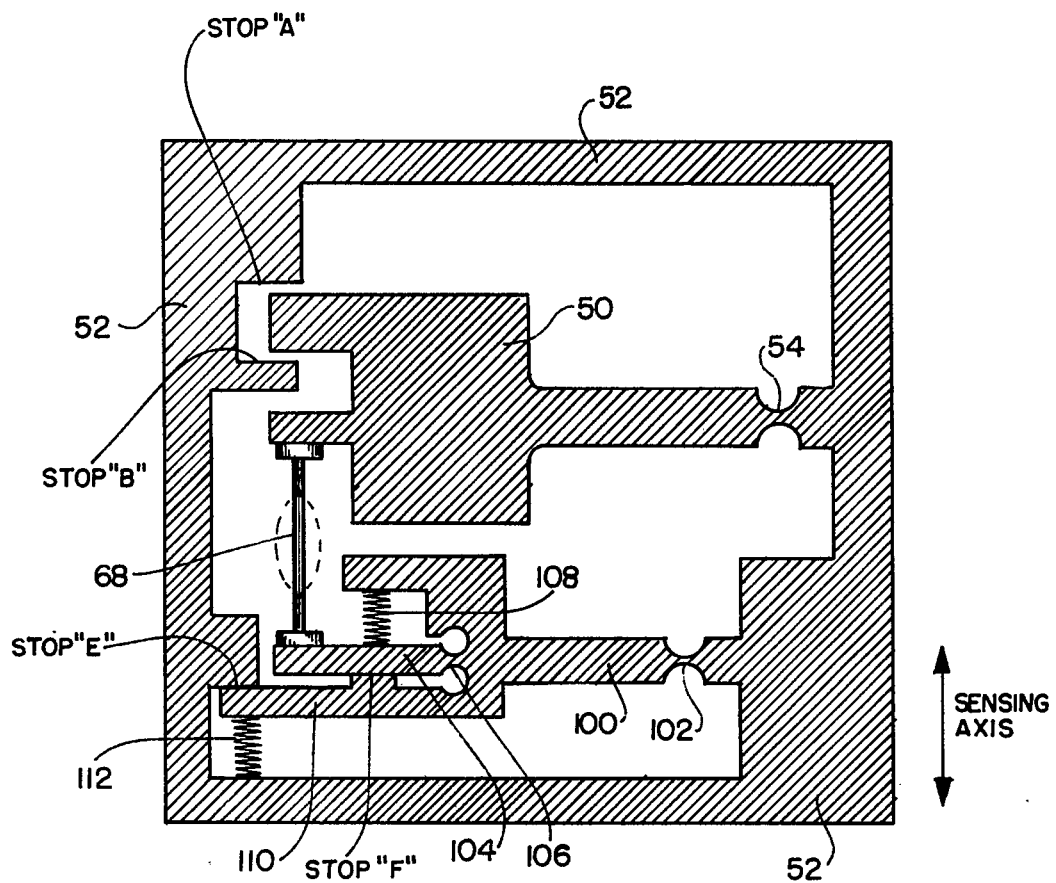
FIG. 5 is a schematic sectional representation of a second embodiment of the invention.

The embodiment of FIG. 5 is similar to the embodiment of FIGS. 2-4, and like elements have been designated by the same numbers. In the embodiment of FIG. 5, both relief arms are located at the same end of resonator 68, namely, at the housing end. It will be apparent that both relief arms could, if so desired, be located at the proof mass end of the resonator.

In the embodiment of FIG. 5, a support arm 100 is hinged to the housing 52 by means of a pendulum flexure hinge 102. A relief arm 104 is hinged to the support arm 100 by means of a pendulum flexure hinge 106, and the relief arm is biased against a stop "F" on the arm by means of a pre-loading spring 108. A second relief arm 110 is formed integral with the support arm 100, and is biased against a stop "E" on housing 52 by means of a pre-loading spring 112.

The operation of the mechanism of FIG. 5 is similar to that of FIGS. 2-4 described above.

Figure 6:
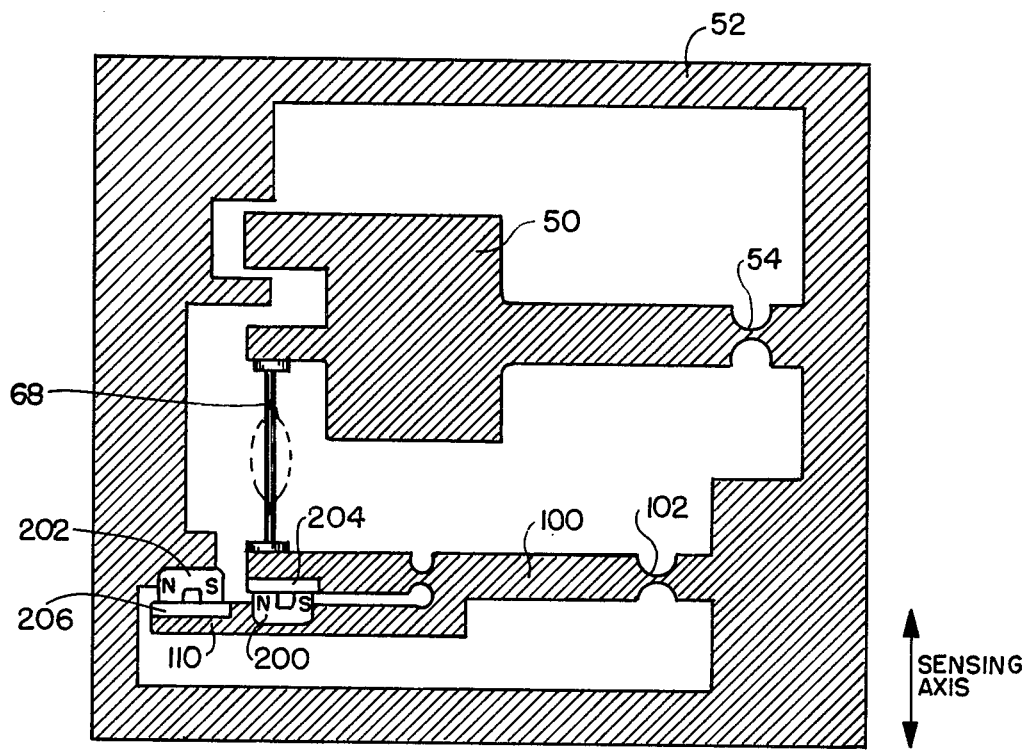
FIGS. 6-8 are selected schematic sectional representations of a third embodiment of the invention in different operating modes.
Figure 7:
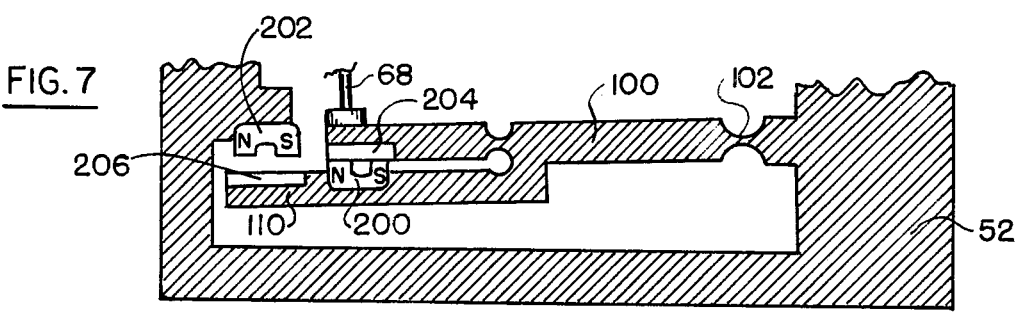
Figure 8:
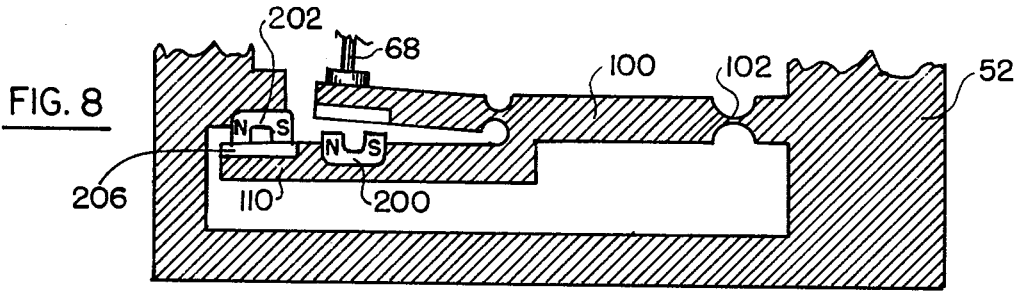

In the embodiment of FIGS. 6, 7 and 8, the springs 108 and 112 of the accelerometer of FIG. 5 have been replaced by permanent magnets 200 and 202 respectively, together with corresponding keepers 204 and 206. The unloading action occurs when the resonator forces exceeds the magnetic attraction force between either one of the magnets and its keeper. The unloading action due to an excessive positive force along the sensing axis is shown in FIG. 7, and the unloading action due to an excessive negative force is shown in FIG. 8.

The embodiment of the invention shown in FIG. 9 incorporates two proof masses 150, 152, like the prior art assembly of FIG. 1; and two vibrating beam resonators 154, 156, one in tension and one in compression. Proof mass 150 is hinged to housing 158 by means of a flexure hinge 160; and proof mass 152 is hinged to the housing by means of a flexure hinge 162.

One end of resonator 154 is secured to proof mass 150 and the other end of the resonator is secured to a relief arm 164. As in the embodiment of FIG. 5, relief arm 164 is hinged to a support arm 166 by means of a flexure hinge 168, and the support arm is hinged to housing 158 by a flexure hinge 170. The relief arm is biased against stop "G" by a pre-loading spring 172. A second relief arm 174 is formed integral with support arm 166 and is biased against stop "H" on housing 158 by a pre-loading spring 176.

One end of resonator 156 is secured to proof mass 152, and the other end of the resonator is secured to a relief arm 178. Relief arm 178 is hinged to a support arm 180 by a flexure hinge 182, and the support arm is hinged to the housing 158 by a flexure hinge 184. The relief arm 178 is biased against a stop "I" by a pre-loading spring 186. A second relief arm 188 is formed integral with support arm 180 and is biased against stop "J" in housing 158 by a pre-loading spring 190.

The operation of the embodiment of FIG. 9 is similar to that of FIG. 5, except that two resonators are used as in the prior art embodiment of FIG. 1, one in tension and one in compression.

The invention provides, therefore, an improved vibrating beam accelerometer which includes an unloading mechanism for the vibrating beam resonator. This unloading mechanism permits the full range of the resonator to be utilized without the likelihood of fracture of the resonator in the presence of excessive acceleration or shock input forces.

It will be appreciated that although particular embodiments of the invention have been shown and described, modifications may be made. It is intended in the following claims to cover all modifications which fall within the true spirit and scope of the invention.

What is claimed is:

1. An accelerometer, or the like, comprising:
   a housing;
   a proof mass mounted in the housing for reciprocal movement with respect to a sensing axis;
   an elongated vibrating beam resonator; and
   means coupling the ends of the resonator to the housing and to the proof mass respectively so that the axis of the resonator is parallel to the sensing axis, said last-named means including relief means for releasing said resonator when the force along said sensing axis exceeds a particular threshold.

2. The accelerometer defined in claim 1, in which said last-named means includes a relief arm, and a pre-loading means for the relief arm.

3. The accelerometer defined in claim 2, in which said pre-loading means comprises a spring.

4. The accelerometer defined in claim 2, in which said pre-loading means comprises a permanent magnet.

5. The accelerometer defined in claim 1, and which includes a flexure spring for coupling said proof mass to said housing.

6. The accelerometer defined in claim 1, in which said housing forms stops for limiting the movement of said proof mass in either direction with respect to said sensing axis.

7. The accelerometer defined in claim 1, in which said relief means includes a relief arm attached to one end of said resonator and hinged to said housing, and means for resiliently biasing said relief arm against a stop formed by said housing.

8. The accelerometer defined in claim 1, in which said relief means includes a relief arm attached to one end of the resonator and hinged to the proof mass, and means for resiliently biasing said relief arm against a stop formed by said proof mass.

9. The accelerometer defined in claim 1, in which said relief means includes a first relief arm attached to one end of said resonator and hinged to said housing, and first means for resiliently biasing said first relief arm against a stop formed by the housing, and a second relief arm attached to the other end of said resonator and hinged to said proof mass, and second means for resiliently biasing said second relief arm against a stop formed by said proof mass.

10. The accelerometer defined in claim 1, in which said relief means includes a support arm, a first relief arm attached to one end of the resonator and hinged to said support arm, and first pre-loading means for resiliently biasing said first relief arm against a stop formed on said support arm.

11. The accelerometer defined in claim 10, and which includes a second relief arm attached to said support arm, and second pre-loading means for resiliently biasing said second arm against a stop.

12. The accelerometer defined in claim 11, in which said last-named stop is formed by said housing.

13. The accelerometer defined in claim 11, in which said second pre-loading means comprises a spring.

14. The accelerometer defined in claim 11, in which said second pre-loading means includes a permanent magnet.

15. The accelerometer defined in claim 10, and which includes hinge means for coupling said support arm to said housing.

16. The accelerometer defined in claim 10, in which said first pre-loading means comprises a spring.

17. The accelerometer defined in claim 10, in which said first pre-loading means includes a permanent magnet.

18. The accelerometer defined in claim 1, and which includes:
   a second proof mass mounted in the housing for reciprocal movement with respect to the sensing axis;
   a second elongated vibrating beam resonator; and
   means coupling the ends of the second resonator to the housing and to the second proof mass respectively so that the axis of the second resonator is parallel to the sensing axis, said last-named means including relief means for releasing said second resonator when the force along said sensing axis exceeds a particular threshold.

19. The accelerometer defined in claim 18, in which the first-named resonator is supported in tension between the first-named proof mass and said housing, and said second resonator is supported in compression between said second proof mass and the housing.

* * * * *